United States Patent [19]

Smith

[11] 4,160,624
[45] Jul. 10, 1979

[54] WATER VEHICLE-ACTUATED AIR COMPRESSOR AND SYSTEM THEREFOR

[75] Inventor: Roland L. Smith, Homestead, Fla.

[73] Assignee: Nu Watt, Inc., Palm Harbor, Fla.

[21] Appl. No.: 870,032

[22] Filed: Jan. 16, 1978

Related U.S. Application Data

[62] Division of Ser. No. 814,685, Jul. 11, 1977, Pat. No. 4,115,034.

[51] Int. Cl.$^2$ .............................................. F04B 35/00
[52] U.S. Cl. ...................................... 417/330; 60/506
[58] Field of Search .................. 417/332, 330; 290/42, 290/53; 60/498, 499, 505, 506

[56] References Cited

U.S. PATENT DOCUMENTS

| 970,048 | 9/1910 | Harmon | 417/332 |
|---|---|---|---|
| 988,508 | 4/1911 | Reynolds | 417/332 |
| 1,925,742 | 9/1933 | Bamber et al. | 60/498 X |
| 3,151,564 | 10/1964 | Rosenberg | 60/499 |
| 3,603,804 | 9/1971 | Casey | 417/332 X |

FOREIGN PATENT DOCUMENTS

| 562217 | 8/1958 | Canada | 417/332 |
|---|---|---|---|
| 429353 | 1/1948 | Italy | 417/332 |

*Primary Examiner*—Carlton R. Croyle
*Assistant Examiner*—Richard E. Gluck
*Attorney, Agent, or Firm*—Oltman and Flynn

[57] ABSTRACT

A water vehicle-actuated air compressor and a system are disclosed for utilizing compressed air to operate an electrical generator to generate electricity. The water vehicle-actuated air compressor includes an actuator, a cylinder, and a piston in the cylinder reciprocable in response to actuation of the actuator by the motion of the vehicle through the water for compressing air in the cylinder. The cylinder is provided with a first vent means for introducing air into the cylinder behind the piston during a forward stroke of the piston, a valve-controlled second vent means for introducing air into the cylinder on the other side of the piston during the reverse stroke thereof, and outlet means for supplying air compressed by the piston during the forward stroke thereof to a utilization device. In the system for generating electricity, the air compressor is combined with an electricity generator operated by compressed air to generate electricity and at least one air storage unit coupled between the electricity generator and the outlet means of the cylinder for storing compressed air enroute to the generator. The air storage unit may be supplied with compressed air from other vehicle-actuated air compressors to provide a network for supplying compressed air to the air operated electricity generator.

3 Claims, 9 Drawing Figures

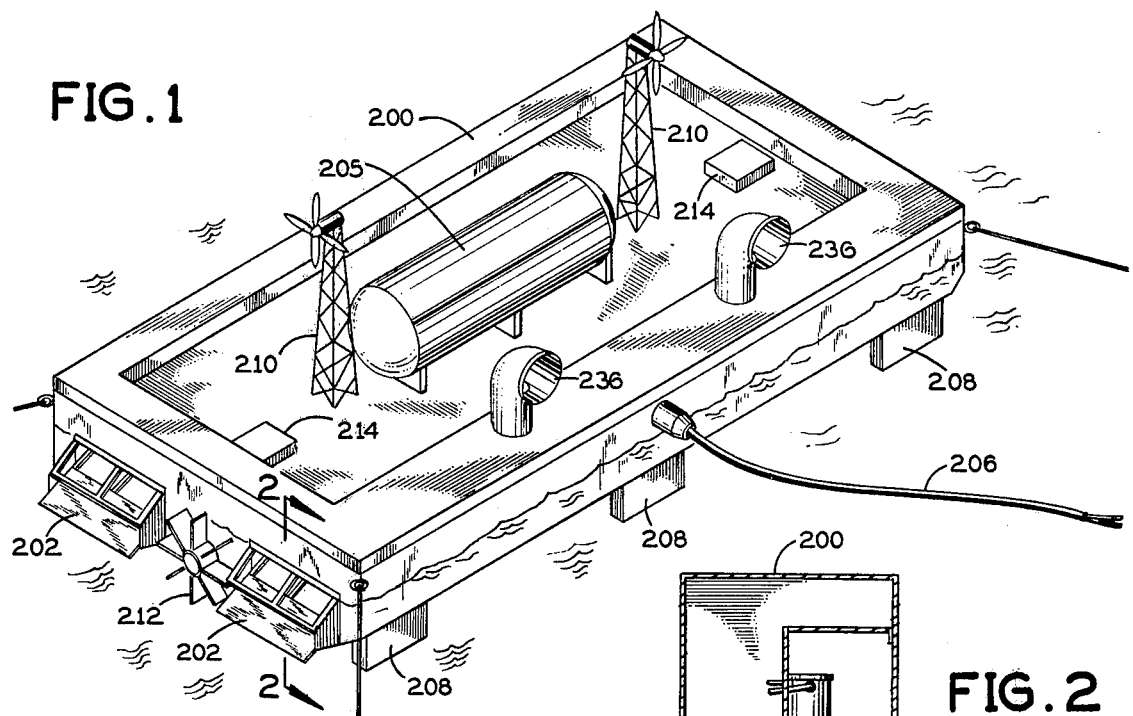
FIG.1
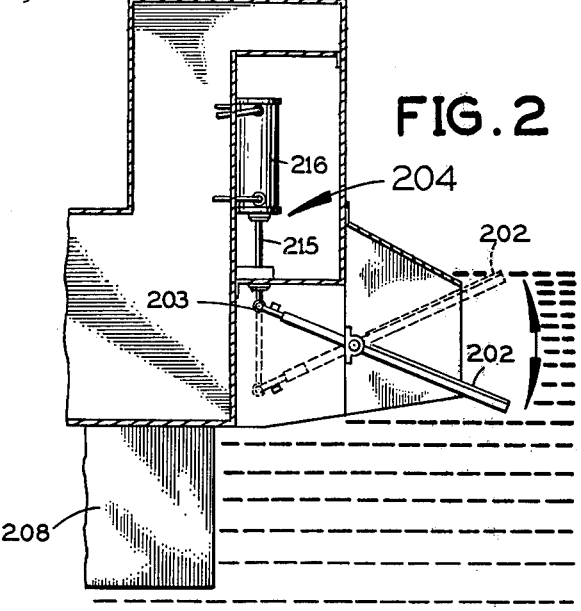
FIG.2
FIG.4
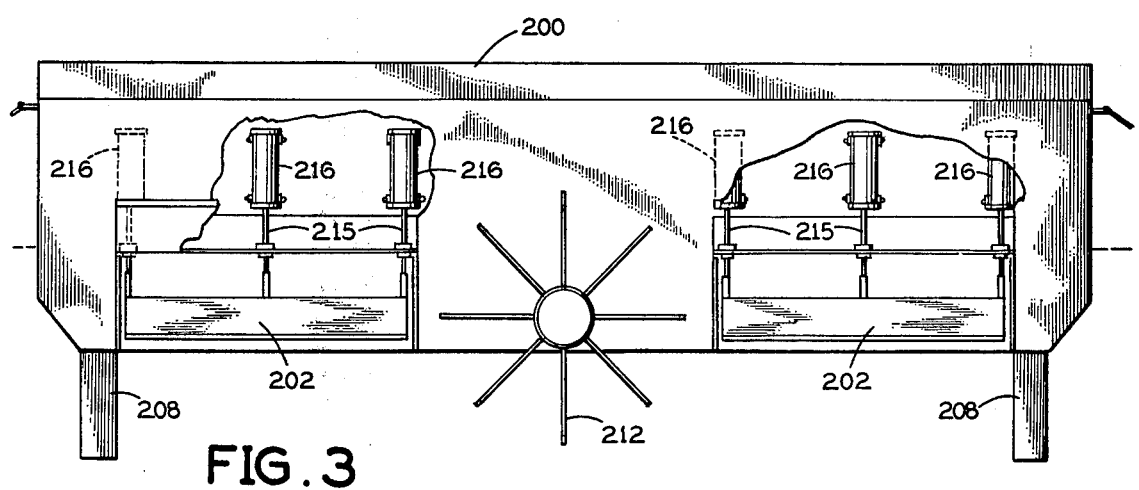
FIG.3

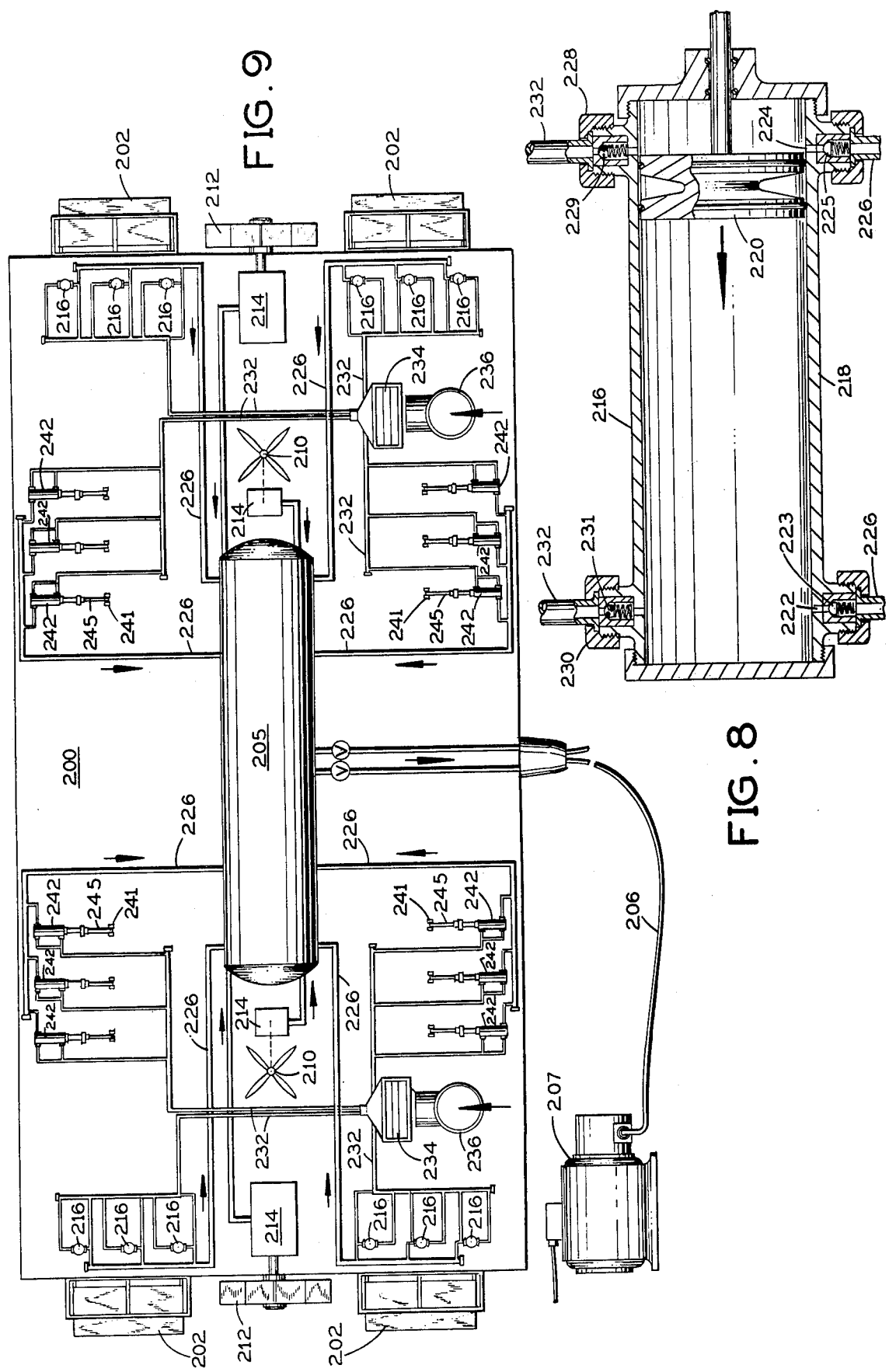

WATER VEHICLE-ACTUATED AIR COMPRESSOR AND SYSTEM THEREFOR

CROSS-REFERENCE TO RELATED APPLICATION

This application is a division of my copending application, Ser. No. 814,685, filed July 11, 1977.

BACKGROUND OF THE INVENTION

At the present time, it appears that shortages of conventional forms of energy, particularly oil, have become critical. Much effort has been devoted to finding alternate sources of energy. Most energy sources suffer from drawbacks. Some are limited as to the amounts available, and when a particular material has been used it is gone forever. They are not available to all nations. Some have created ecological problems. It is not known how to handle some energy sources safely or dispose of their wastes safely. Most, with the exception of gravity, wind and water, are not forces by themselves. They can do nothing unless something is done to them.

SUMMARY OF THE INVENTION

The present invention provides a system for compressing air in response to the naturally occurring wave motion in a body of water and utilizing the compressed air to generate electrical energy. The system includes an electricity generator operated by compressed air, and an air storage means operatively connected to the generator to supply compressed air to the generator for operating the same. One or more actuators are provided for actuation in response to motion of waves in a body of water. A piston in a cylinder is movable in forward and reverse strokes in response to actuation of the actuator for compressing air in the cylinder. The cylinder is provided with a first vent means for introducing air into the cylinder behind the piston during a forward stroke thereof. A second valve-controlled vent means is provided for the cylinder for introducing air into the cylinder on the other side of the piston during the reverse stroke thereof. Outlet means for the cylinder supplies air compressed by the piston to the air storage means enroute to the electrical generator. Thus, waves acting on the vehicle are used to compress air and the compressed air is utilized to generate electricity.

Accordingly, it is an object of the present invention to enable waves acting on a water vehicle to operate a piston and cylinder device for compressing air which is ultimately supplied to an electrical generator operated by compressed air to generate electricity.

Another object of the invention is to provide a water vehicle-actuated air compressor in which a piston in a cylinder is reciprocated by the operation of an actuator in response to waves acting on the vehicle to compress air in the cylinder which can be supplied to a utilization device.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a schematic perspective view of a floating barge provided with a water wave-operated system in accordance with the present invention for compressing air to generate electricity;

FIG. 2 is a vertical section taken along the line 2—2 in FIG. 1;

FIG. 3 is an end elevational view, partly broken away for clarity, of the barge showing several air compressors thereon;

FIG. 4 is a fragmentary perspective view of a coupling between one of these air compressors and a vertically reciprocable, pivoted paddle which operates it;

FIG. 8 is a longitudinal section through one of the cylinder and piston air compressors in the present system; and FIG. 9 is a schematic diagram of the present system.

Figure 5:
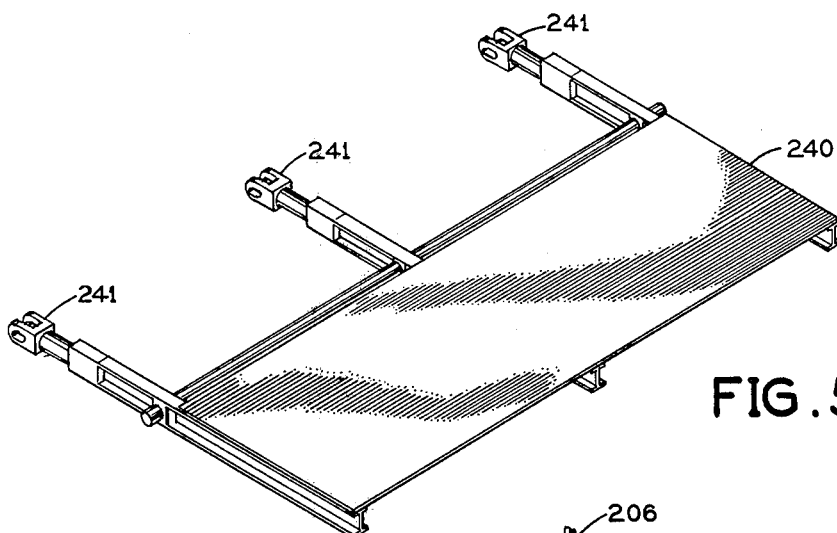
FIG. 5 is a perspective view of one of the horizontally reciprocable, pivoted paddles in the present system.

Before explaining the disclosed embodiment of the present invention in detail, it is to be understood that the invention is not limited in its application to the details of the particular arrangement shown, since the invention is capable of other embodiments. Also the terminology used herein is for the purpose of description and not of limitation.

FIGS. 1 through 9 illustrate an embodiment of the invention in which compressed air is derived from waves acting on paddles carried by an anchored water vehicle 200, such as a barge. The wave action causes paddles such as paddle 202 to reciprocate, thus compressing air in air compressors 204 (FIG. 2). The compressed air is stored in a tank 205 (FIG. 1) which may be located on the barge 200, and the air is ultimately supplied through a line 206 to an air-driven electrical generator 207 (FIG. 9) located on the barge or on the shore. The air driven electrical generator may comprise an air motor of conventional design driving an electrical generator, also of conventional design.

The barge 200 is anchored by anchors 201 and may have vertical stand-off legs 208 to prevent the equipment mounted below it from fouling on the bottom of the body of water. The barge may carry windmills 210 and rotary paddles 212 which also operate suitable air compressors 214 that are connected to the air storage tank 205. Thus, the windmills and rotary paddles serve as other sources for supplying compressed air to the tank 205 and ultimately to the electrical generator.

As shown in FIG. 2, the air compressor units 204 are mounted at the side of the barge, and the horizontally pivoted, vertically reciprocatable paddles 202 serve as actuators for the air compressor units 204. These air compressor units also include piston and cylinder devices 216 of the type shown in FIG. 8. Each device 216 includes a cylinder 218 and a piston 220 reciprocable in the cylinder. The piston 220 is suitably sealed relative to the cylinder. At the left end of the cylinder 218 in FIG. 6, there is a valve controlled outlet 222, and at the right end of the cylinder 218 in FIG. 6 there is a valve controlled outlet 224. The outlet 222 includes a ball-check valve 223, and the outlet 224 includes a ball-check valve 225. The outlets 222 and 224 are connected by suitable lines 226 to the air storage tank 205. As the piston 220 reciprocates, it compresses air during both the forward and reverse strokes thereof, and the compressed air is supplied through outlets 222 and 224 to the tank 205.

Figure 6:
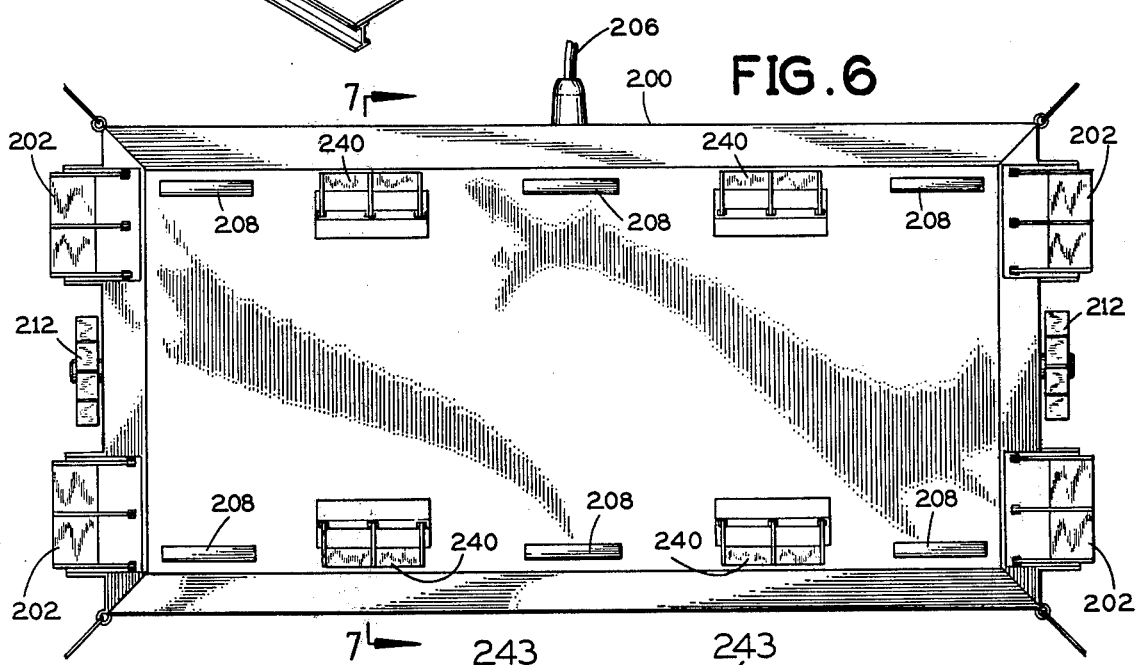
FIG. 6 is a bottom plan view of the barge in FIG. 1.

The cylinder 218 has a vent 228 at the right end thereof in FIG. 6, and another vent 230 at the left end thereof in FIG. 6. Vent 228 includes a ball-check valve 229, and vent 230 includes a ball-check valve 231. The vents serve to introduce air into the cylinder behind the piston on the suction stroke thereof. In this embodiment, air is supplied to the vents through lines 232 which lead from an air filter unit 234 that is open to the atmosphere at inlets 236. As shown in FIGS. 2 and 3, each piston and cylinder device 216 that is operated by a paddle 202 extends vertically on the barge.

Figure 7:
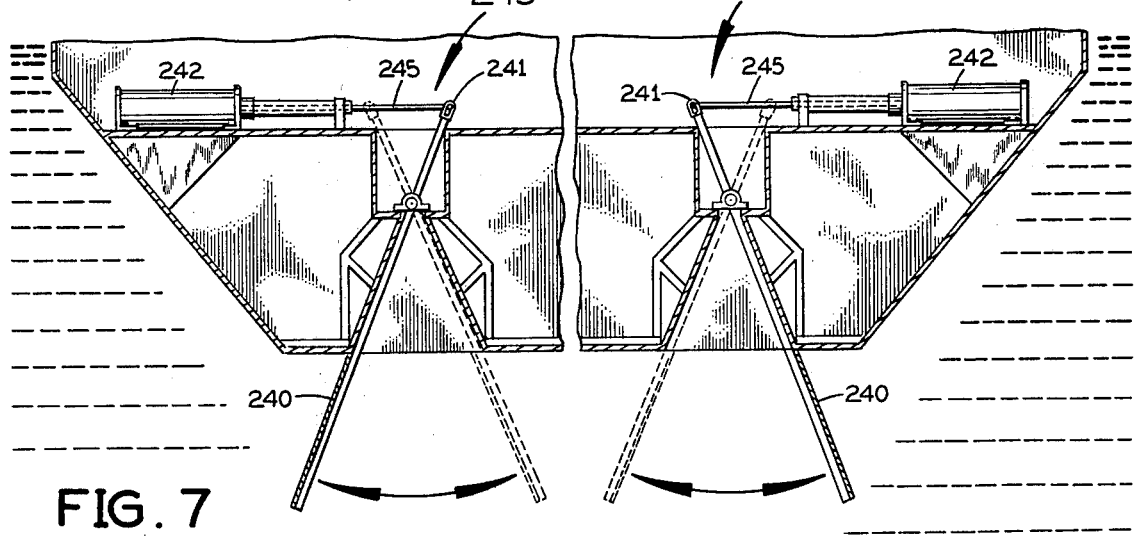
FIG. 7 is a vertical cross-section taken along line 7—7 in FIG. 6.

On the lower side of the barge 200, there are horizontally pivoted, horizontally reciprocable paddles 240 (FIGS. 6 and 7). These paddles 240 serve as actuators for piston and cylinder devices 242 to form additional wave actuated air compressors 243. The piston and cylinder devices 242 may be identical to that shown in FIG. 8. They may have outlet lines 226 leading to the storage tank 205 in accordance with the previous description, and inlet lines 232 leading from the air filter units 234 also in accordance with the previous description.

FIG. 4 shows a coupling 203 for coupling one of the paddles 202 to the piston rod 215 of the piston and cylinder device 216.

FIG. 5 shows one of the paddles 240 which has couplings 241 for coupling the paddle to the piston rods 245 of the air compressor units 243 as shown in FIG. 7. The same construction can be used for paddles 202.

In the operation of this system the up and down movement of each horizontally pivoted paddle 202 in response to wave motion causes the up and down reciprocation of the pistons 220 whose piston rods 215 are pivotally coupled to the inner ends of these paddles, as shown in FIGS. 2 and 4. Also, the back and forth movement of each horizontally pivoted paddle 240 causes the horizontal reciprocation of the pistons in cylinders 242 due to the pivotal couplings between the piston rods 245 and the upper ends of these paddles, as shown in FIG. 7.

I claim:

1. A water wave actuated system for compressing air and thereby generating electrical energy comprising:
    an electricity generator operated by compressed air to generate electricity;
    air storage means operatively connected to said generator to supply compressed air to said generator for operating the same;
    underwater actuator means for actuation in response to waves in a body of water;
    a plurality cylinders;
    a plurality of pistons having forward and reverse strokes respectively in said cylinders and movable in response to actuation of said actuator means by waves for compressing air in said cylinders;
    vent means for each said cylinder communicating with one side of said piston therein for introducing air at atmospheric pressure into said cylinder behind said piston during a forward stroke of said piston;
    valve-controlled vent means for each said cylinder communicating with the other side of said piston therein for introducing air at atmospheric pressure into said cylinder on the side of said piston during a reverse stroke thereof;
    outlet means communicating with said other side of each said piston for supplying air compressed by said piston during a forward stroke thereof to said air storage means enroute to said electricity generator;
    said actuator means comprising a plurality of first paddles totally submerged in the water and horizontally pivoted less than 45 degrees from the horizontal position for up and down movement by waves in the water and operatively coupled to certain of said pistons for reciprocating the latter in the corresponding cylinders;
    and said actuator means further comprising a plurality of second paddles totally submerged in the water and horizontally pivoted less than 45 degrees from the vertical position for horizontal back and forth movement by waves in the water and operatively coupled to the remaining pistons for reciprocating the latter in the corresponding cylinders.

2. A system according to claim 1 wherein certain of said pistons carry a piston rod extending down from said cylinder and operatively coupled to said first paddles respectively to be reciprocated by the latter.

3. A system according to claim 1, wherein certain of said pistons carry a piston rod extending beyond one end of said cylinder and operatively coupled to said second paddles respectively to be reciprocated by the paddle's back and forth movement.

* * * * *